V. GEBHARDT.
FISH HOOK.
APPLICATION FILED DEC. 9, 1913.
1,157,772.
Patented Oct. 26, 1915.
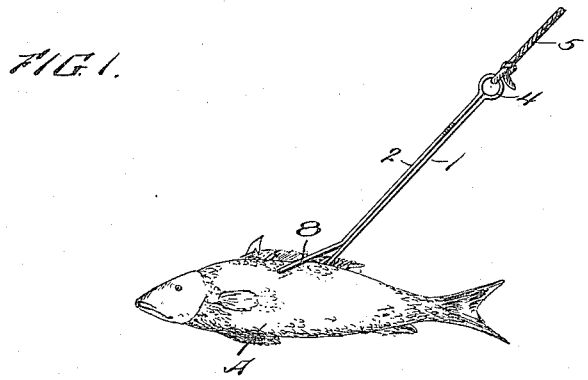
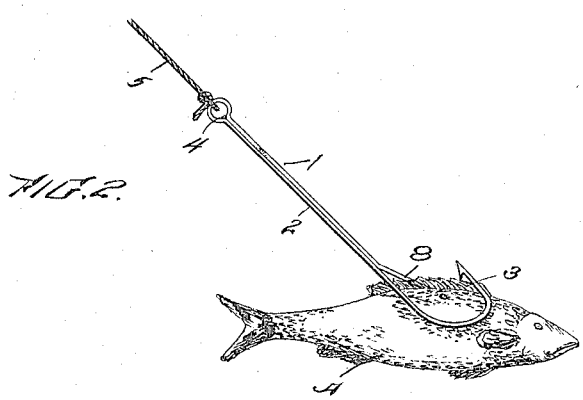
Witnesses
Inventor
Victor Gebhardt,
By
Attorney

UNITED STATES PATENT OFFICE.

VICTOR GEBHARDT, OF ST. LOUIS, MISSOURI.

FISH-HOOK.

1,157,772.

Specification of Letters Patent.

Patented Oct. 26, 1915.

Application filed December 9, 1913. Serial No. 805,576.

*To all whom it may concern:*

Be it known that I, VICTOR GEBHARDT, a citizen of the United States, residing at St. Louis, in the State of Missouri, have invented certain new and useful Improvements in Fish-Hooks, of which the following is a specification.

This invention relates to improvements in fishing hooks.

The invention has for its object, primarily, the provision of a bait-holding attachment or hook for the fishing or game hook.

A further object is the adaptation of the attachment for holding or presenting a live bait to the fish or game.

A still further object is the retention and presentation of the bait, headforemost, to the fish or game and to insure the impalement of the latter, and to effect such impalement by way of the upper jaw of the fish or game.

A still further object is to carry out the aforesaid ends in a simple and effective manner and with little additional expense.

The invention therefore consists generically of a bait attachment for the game or fishing hook, and of such an attachment whereby a live bait may be presented to the fish or game; also of the peculiar construction and arrangement of the bait attachment, all substantially as hereinafter more fully disclosed and defined by the appended claim.

In the accompanying drawing is illustrated the preferred embodiment of my invention, wherein it will be understood that various changes and modifications may be made as to the detailed construction and arrangement of parts without departing from the spirit of the invention, and in which, Figures 1 and 2 are opposite side views, showing the application of the bait to my improved fishing hook and its attachment. Fig. 3 is a plan view of the same. Fig. 4 is a detached side view of my fishing or game hook.

In carrying out my invention, I provide a hook 1 which may be termed the fishing or game hook, and in continuation of which is formed by doubling or returning the shank 2 thereof upon itself, a supplemental or auxiliary hook 3, an eye 4 being formed at the point of conjunction of the shanks of the two hooks for the suitable attachment of the trawl or line 5. The shank 6 of the auxiliary or supplemental hook 3 is generally bowed or laterally curved, as at 7, it being recurved, as at 8, and having its point extending at right angles to its general trend and also under and transversely of, and close to the point of the hook 1, its recurvature also being somewhat deflected away from the shank 2 of the hook 1 and toward the latter, as seen in Figs. 1, 2 and 4.

From the construction, it will be seen that by springing the shank of the auxiliary hook 3 outwardly or away from the shank of the hook 1, and disposing the bait A which may be a live minnow, smelt, shrimp and the like between the shanks of the two hooks, headforemost, as suggested especially in Figs. 1 and 2, the point of the hook 3 may be caused to pierce the bait, slightly inwardly from its spinal column. The recoil action of the sprung-out auxiliary hook, as it is released, provides for such bait-piercing action of said auxiliary hook, which is aided by the hand, the bait thus being retained for fishing purposes. The game or fish will be naturally attracted toward the wriggling or struggling bait and in endeavoring to take it into its mouth, the upstanding point of the hook 1 will engage or enter the upper jaw of the fish or game, thus effecting its capture. By thus causing the hook to engage the more firm portion or upper jaw of the mouth of the fish, instead of its lower jaw, the catching of the fish and its retention are insured more so than were the lower portion of the mouth engaged because of the soft fleshy character of the latter, allowing of the hook to tear out of the same.

The game or fishing hook 1, it is observed, may be devoid of a barb or beard, and equally serve its purpose as arranged with the type of bait-carrying attachment provided by my invention.

I claim—

A fishing or game hook including an auxiliary hook whose shank is bowed or laterally curved and recurved, its point being contiguous and at right angles to the point of the aforesaid hook, said recurvature being deflected to extend under and transversely of, and close to the point of the primary hook, said recurvature also, being somewhat deflected from the shank of the primary hook.

In testimony whereof I affix my signature in presence of two witnesses.

VICTOR GEBHARDT.

Witnesses:
 ERNST WITTKOPF,
 CHAS. MUELLER.

Copies of this patent may be obtained for five cents each, by addressing the "Commissioner of Patents, Washington, D. C."